United States Patent [19]

Williams

[11] Patent Number: 5,210,869

[45] Date of Patent: May 11, 1993

[54] METHOD AND SYSTEM FOR AUTOMATED TRANSMISSION OF FAILURE OF DELIVERY MESSAGE IN A DATA PROCESSING SYSTEM

[75] Inventor: Marvin L. Williams, Lewisville, Tex.

[73] Assignee: International Business Machines Corporation, Armonk, N.Y.

[21] Appl. No.: 528,678

[22] Filed: May 24, 1990

[51] Int. Cl.$^5$ .................. G06F 3/00; G06F 13/00
[52] U.S. Cl. ..................... 395/600; 364/283.3; 364/284.3; 364/DIG. 1
[58] Field of Search ................. 395/600, 650, 700

[56] References Cited

U.S. PATENT DOCUMENTS 4,962,532 10/1990 Kasiraj et al. .................... 395/600
5,006,978 4/1991 Neches ............................. 395/600

*Primary Examiner*—Thomas M. Heckler
*Assistant Examiner*—John Q. Chavis
*Attorney, Agent, or Firm*—Andrew J. Dillon

[57] ABSTRACT

A method and system are disclosed for automatically transmitting a message to the originator of an electronic document from an intended recipient upon a failure of the system to successfully deliver that document. In one embodiment of the present invention, a user is prompted to enter a selected message in response to any action which disables the delivery of an electronic document. Thereafter any attempted delivery of an electronic document will result in an automatic transmittal of the selected message to the originator of the electronic document. Additionally, the user may specify that the selected message is to be transmitted to a selected group of document originators and no others; that the selected message is to be transmitted only in response to a particular type of delivery failure; or, that the selected message is only valid during a selected time frame. In this manner an intended recipient may selectively notify the originator of an electronic document of the reasons for a failure of delivery and the likely duration of such failure. In data processing systems in which a recipient may specify the automatic deletion from his or her in-basket of an electronic document upon the elapsing of a specified delivery time or other specified reasons, the recipient may also elect to have a message automatically transmitted to one or more originators of deleted documents.

3 Claims, 3 Drawing Sheets

METHOD AND SYSTEM FOR AUTOMATED TRANSMISSION OF FAILURE OF DELIVERY MESSAGE IN A DATA PROCESSING SYSTEM

BACKGROUND OF THE INVENTION

1. Technical Field

The present invention relates in general to methods of improving data processing systems and in particular to methods of efficiently managing the communication of electronic documents within a data processing system. Still more particularly, the present invention relates to methods and systems for automatically transmitting a user specified message to the originator of an electronic document from the intended recipient in response to a failure of the system to successfully deliver the document.

2. Description of the Related Art

Electronic mail systems are rapidly supplanting traditional paper mail systems in the modern office. Large distributed data processing systems are often utilized to permit the rapid transmittal of electronic documents over large distances between thousands of enrolled system users. By utilizing such systems large amounts of data may be rapidly and accurately distributed throughout the data processing system.

Modern state-of-the-art data processing systems, such as CCITT X.400 and PROFS, by International Business Machines Corporation, provide an indication of the delivery or non-delivery of an electronic mail item that may be obtained from the system operator or the electronic mail server. This indication merely comprises a straightforward delivery of non-delivery confirmation without additional information. Thus, in the event an electronic document delivery has failed, the originator of that document will not receive any information regarding the reason or reasons that delivery has failed. Further, no information is provided which will indicate to the originator the likely duration of the period of time during which delivery of the document will continue to fail.

In view of the above, it should be apparent that a need exists for a system which can provide an indication of the reasons for non-delivery of an electronic document and a likely period of time during which delivery cannot occur.

SUMMARY OF THE INVENTION

It is therefore one object of the present invention to provide a method of improving data processing systems.

It is another object of the present invention to provide a method of efficiently managing the communication of electronic documents within a data processing system.

It is yet another object of the present invention to provide a method and system for automatically transmitting a user specified message to the originator of an electronic document from the intended recipient in response to the failure of the system to successfully deliver the document.

The foregoing objects are achieved as is now described. The method and system of the present invention permits the automatic transmittal of a message to the originator of an electronic document from an intended recipient upon a failure of the system to successfully deliver that document. In one embodiment of the present invention, a user is prompted to enter a selected message in response to any action which disables the delivery of an electronic document. Thereafter any attempted delivery of an electronic document will result in an automatic transmittal of the selected message to the originator of the electronic document. Additionally, the user may specify that the selected message is to be transmitted to a selected group of document originators and no others; that the selected message is to be transmitted only in response to a particular type of delivery failure; or, that the selected passage is only valid during a selected time frame. In this manner an intended recipient may selectively notify the originator of an electronic document of the reasons for a failure of delivery and the likely duration of such failure. In data processing systems in which a recipient may specify the automatic deletion from his or her in-basket of an electronic document upon the elapsing of a specified delivery time or other specified reasons, the recipient may also elect to have a message automatically transmitted to one or more selected originators of deleted documents.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
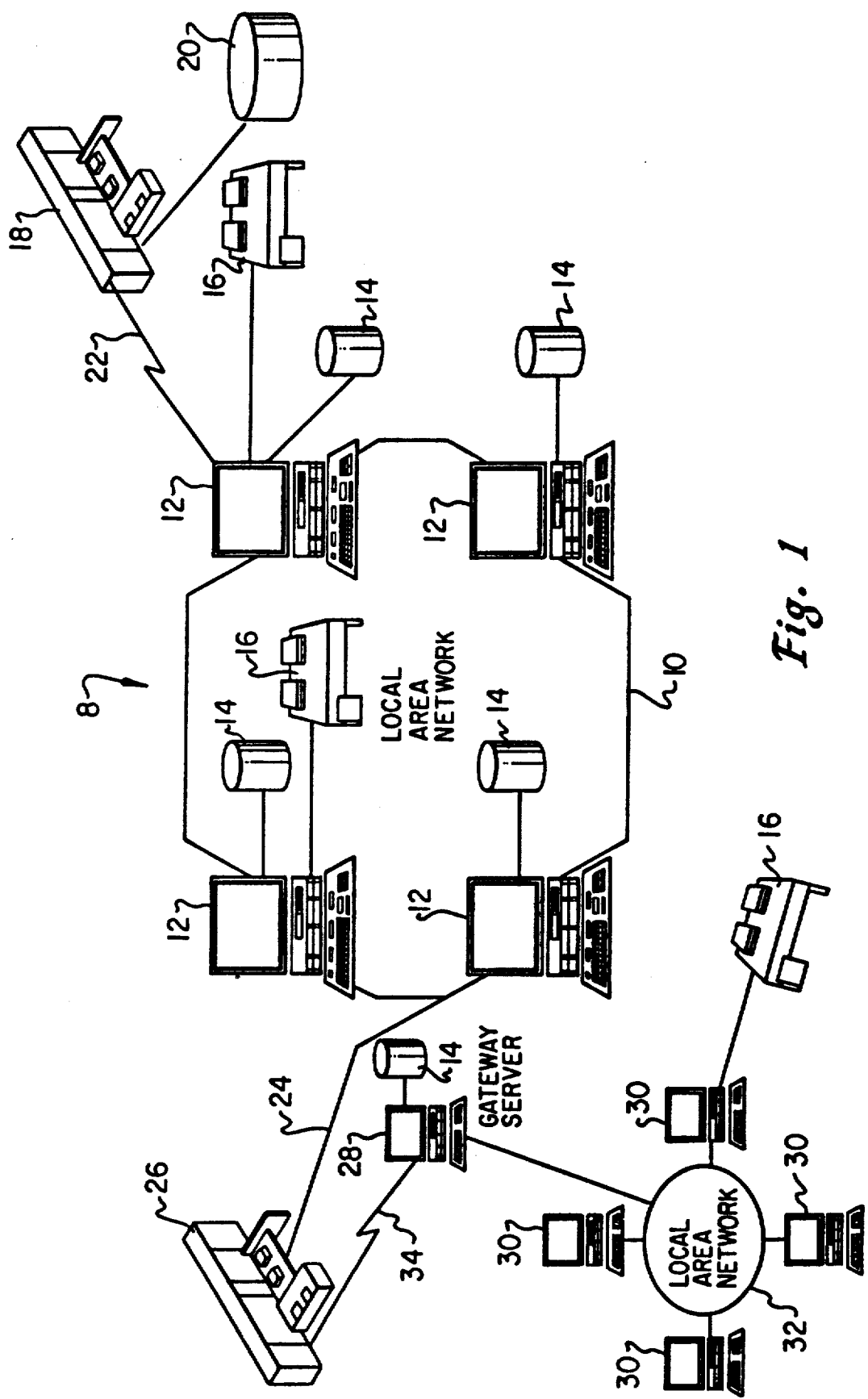
FIG. 1 is a pictorial representation of a distributed data processing system which may be utilized to implement the method and system of the present invention.

With reference now to the figures and in particular with reference to FIG. 1, there is depicted a pictorial representation of a data processing system 8 which may be utilized to implement the method and system of the present invention. As may be seen, data processing system s may include a plurality of networks, such as Local Area Networks (LAN) 10 and 32, each of Which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more Such storage devices 14 may be utilized, in accordance with the method of the present invention, to store the various data objects or documents which may be periodically accessed and processed by a user within data processing system 8, in accordance with the method of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, which may be preferably coupled to Local Area Network (LAN) 10 by means of Communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and Controlled by mainframe computer 18, as Resource Manager or Library Service for the data processing procedures and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for a user within one portion of distributed data processing network s to transmit a data object or document to a user in another portion of data processing network 8. In order to maintain a semblance of order within the documents being transmitted within data processing network 8 it is desirable to be able to determine whether or not a document delivery has successfully occurred. As discussed above, this is generally accomplished in the prior art by the provision of a simple response from the system which indicates whether a document was successfully delivered. There exists no method in the prior art whereby additional information regarding the delivery or non-delivery of such a document may be transmitted to the originator of that document.

However, as those skilled in the art will appreciate, it is often necessary or desirable to permit a user to determine the reasons why a particular document was not delivered. For example, some automated systems permit an intended recipient to automatically forward his or her mail to a second individual. In this manner, a document intended for the original recipient will be undeliverable since that recipient's mail is automatically forwarded to a third party. Of course, those skilled in the art will appreciate that there exists a multitude of reasons why a particular electronic document may not be deliverable during a particular period of time. By utilizing the method of the present invention a user may provide an infinitely varied number of comments which may be stored and automatically transmitted to the originator of an undelivered document in response to the nondelivery of an electronic document. Additionally, these comments may clearly be tailored to indicate with some specificity the reason for non-delivery in those cases where multiple reasons exists for the nondelivery of a particular document.

Figure 2:
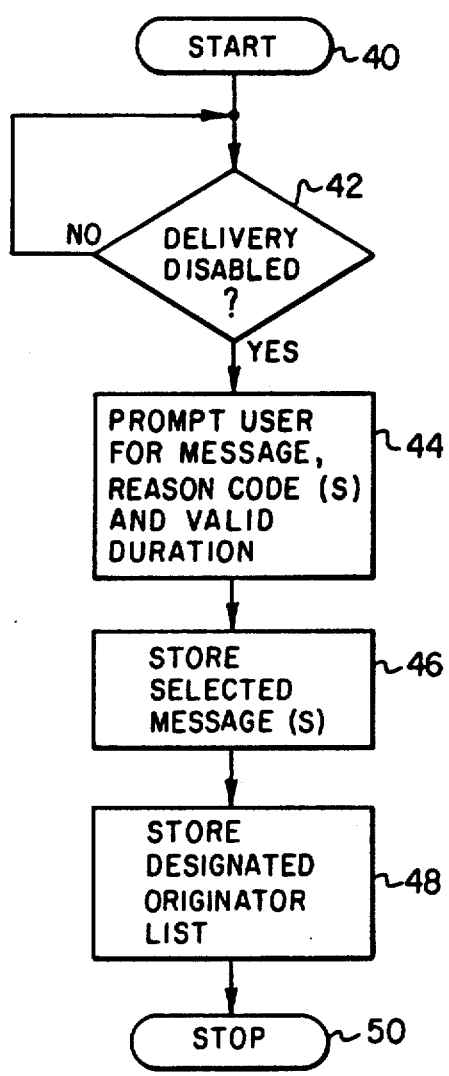
FIG. 2 is a high level flow chart depicting the establishment of a selected failure of delivery message in accordance with the method of the present invention.

Referring now to FIG. 2, there is depicted a high level flow chart which illustrates the establishment of a selected failure of delivery message in accordance with the method of the present invention. As is illustrated, the process begins at block 40 and thereafter passes to block 42 wherein a determination is made as to whether or not any action has taken place which will disable the delivery of an electronic document. If not, the process returns iteratively to await such activity.

However, in the event an action has taken place which will disable the delivery of an electronic document, such as the specification by a recipient that documents intended for that recipient are to be autoforwarded to a second recipient, then the user will be prompted, as illustrated in block 44, to enter a selected message or comment to be automatically transmitted to originators of electronic documents in the event of non-delivery. Additionally, the user may enter multiple messages, each message corresponding to a reason code which indicates why a particular document was not delivered. The use may also enter a valid duration period, thereby specifying that a particular message is only valid during a selected period of time. Next, one or more selected messages entered by the user are stored, as depicted in block 46. Block 48 then illustrates the storing of a list of designated originators to whom a failure of delivery message will be transmitted. Of course, the method of the present invention contemplates that a user may elect not to transmit a failure of delivery message to all originators. Thereafter, the process terminates, as illustrated in block 50.

Figure 3:
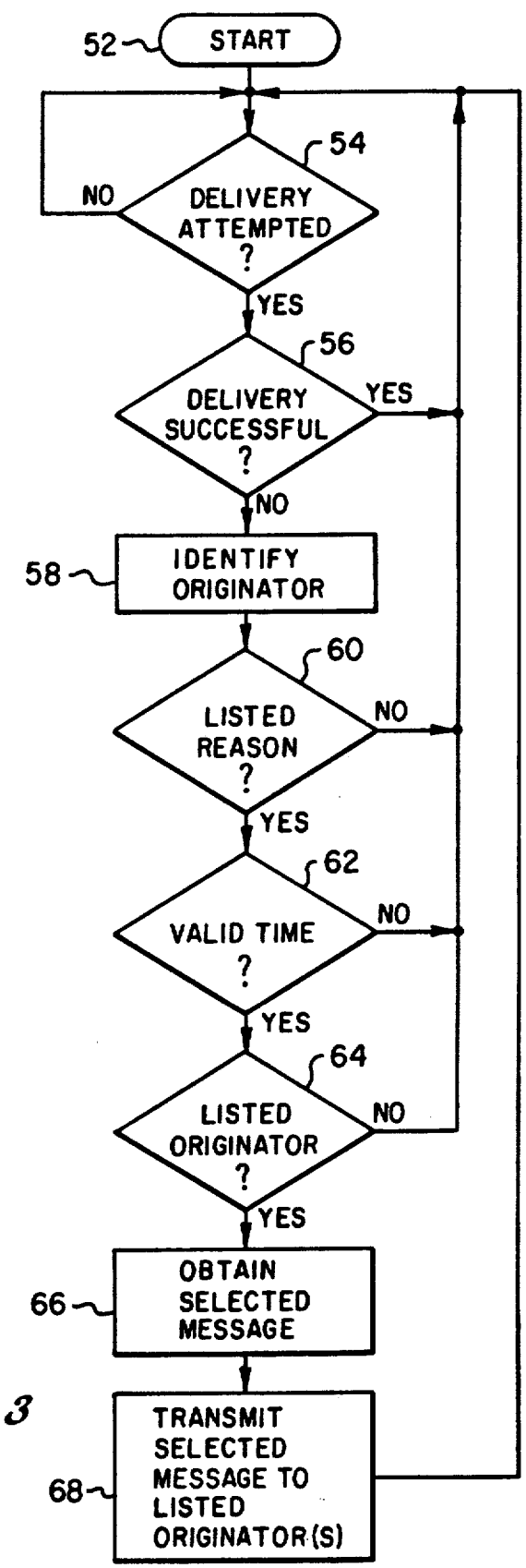
FIG. 3 is a high level flow chart depicting the automated transmission of a failure of delivery message in accordance with the method of the present invention.

With reference now to FIG. 3, there is depicted a high level flow chart which illustrates the automated transmittal of a failure of delivery message, in accordance with the method of the present invention. As above, the process begins at block 52 and thereafter passes to block 54. Block 54 illustrates a determination of whether or not a delivery of an electronic document has been attempted. In the event no delivery has been attempted, the process returns iteratively to await an attempted delivery of an electronic document.

After a delivery of an electronic document has been attempted, as determined above with regard to block 54, then block 56 illustrates a determination of whether or not the delivery of that document was successful. If the delivery of an electronic document was successful, as determined in block 56, then the process returns iteratively to block 54 to await an attempted delivery of a subsequent electronic document.

However, if the delivery of an electronic document was unsuccessful, as determined in block 56, then block 58 illustrates the identifying of the originator of that electronic document. Next, block 60 depicts a determination of whether the reason for the failure of delivery corresponds to a reason code listed by the intended recipient as a reason which will require transmission of a failure of delivery message. If not, the process returns iteratively to block 54. If the reason for failure of delivery corresponds to a listed reason code, block 62 illustrates a determination of whether or not the time frame specified for the failure of delivery message is still valid.

If not, the process again returns iteratively to block 54, without transmitting a failure or delivery message.

Thereafter, block 64 depicts the determination of whether or not the identified originator is listed by the user as an originator for which transmittal of a failure of delivery message is desired. If not, the process returns iteratively to block 54 to await a subsequent delivery attempt. If the identified originator is a listed originator, block 66 illustrates the obtaining of the selected message entered by the user and stored within the data processing system.

Finally, block 68 illustrates the transmittal of that selected message to the identified originator of the unsuccessfully delivered electronic message. In this manner the originator of an electronic message will receive a message from the intended recipient which may explain why the electronic document was not delivered and/or includes an indication of the duration of time for which delivery will not be possible.

Figure 4:
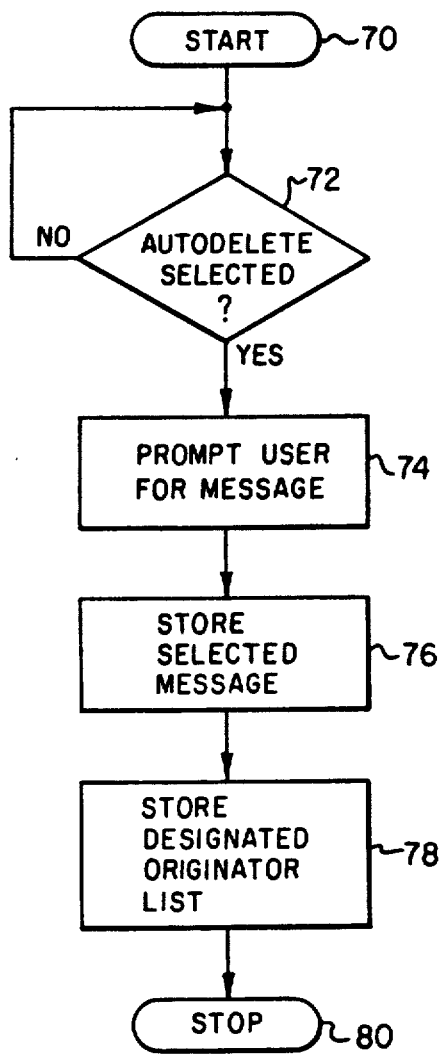
FIG. 4 is a high level flow chart depicting the establishment of a selected failure of delivery message for use upon an automatic deletion of a stored electronic document.

Referring now to FIG. 4, there is depicted a high level flow chart which illustrates the establishment of a selected failure of delivery message for use upon an automatic deletion of a stored electronic document from a user's in-basket. As those skilled in the art will appreciate, certain data processing systems permit an enrolled system user to specify the automatic deletion of an electronic document from the user's electronic in-basket upon the lapsing of the specified delivery time for that document or upon the occurrence of any of a host of specified events. In accordance with the method of the present invention, a method is provided whereby a recipient in such a data processing system may specify a failure of delivery message which is to be transmitted to the originator of an electronic document which has been automatically deleted in accordance with this technique.

As above, this process begins at block 70 and thereafter passes to block 72 which illustrates a determination of whether or not the user in question has selected the aforementioned auto delete function. If not, the process returns iteratively to block 72 until such time as the auto delete function has been selected.

Upon the selection of an auto delete function by a system user, as determined in block 72, block 74 illustrates the prompting of the user for a selected message to be transmitted to the originator of each document which is deleted. Of course, as above, this message may include both the reasons for the deletion of an electronic document prior to its review by a user and/or the likely duration of the period of time during which electronic documents will not be promptly reviewed by the recipient. Next, block 76 illustrates the storing of the selected message for subsequent utilization. As above, block 78 illustrates the listing by the user of those selected originators for when an automatic failure of delivery message transmission is desired. Thereafter, the process terminates, as illustrated in block 80.

Figure 5:
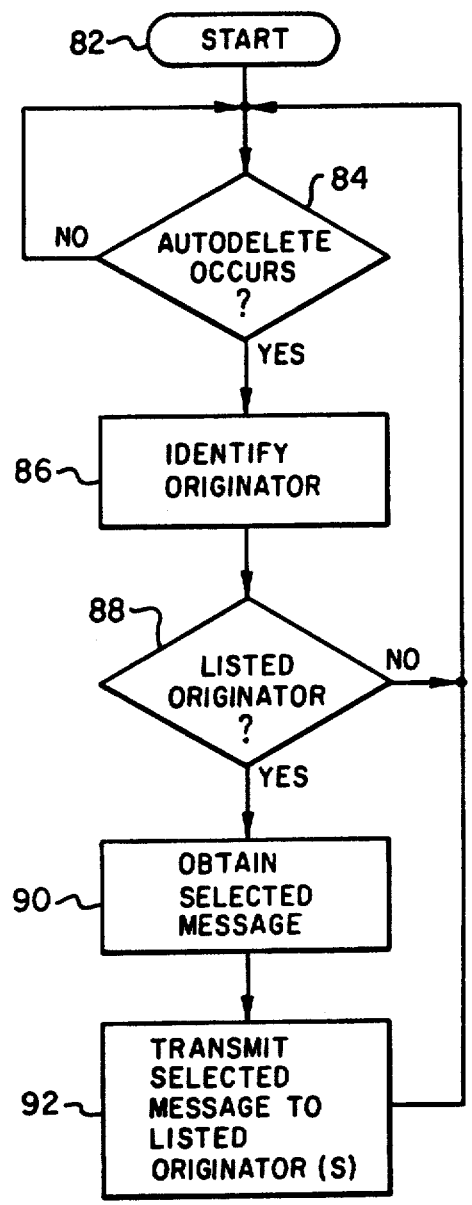
FIG. 5 is a high level flow chart depicting the automatic transmission of a failure of delivery message upon an automatic deletion of a stored electronic document.

Finally, with reference now to FIG. 5 there is depicted a high level flow chart which illustrates the automatic transmission of a failure of delivery message upon an automatic deletion from a user's inbasket of a stored electronic document. As above, the process begins at block 82 and thereafter passes to block 84 in which a determination is made whether or not an automated deletion of an electronic document from a user's electronic in-basket has occurred. If not, the process returns iteratively to block 84 until such time as an automatic deletion of an electronic document has occurred.

In the event an automatic deletion of an electronic document has occurred, as determined in block 84, then block 86 illustrates the identification of the originator of the electronic document which has been automatically deleted. Next, block 88 illustrates a determination of whether or not the identified originator has been listed by the user as an originator for whom an automatic failure of delivery message is desired. If not, the process returns iteratively to block 84 to await the next occurrence of an automated deletion. Thereafter, block 90 depicts the obtaining of the selected message which has been created by the user and stored for utilization in the event of an automatic deletion of an electronic document from that user's in-basket.

Finally, the user selected message is transmitted to the specified originator, as illustrated at block 92. Thereafter, the process returns iteratively to block 84 to await the automatic deletion of a subsequent electronic document from the user's inbasket. In this manner, a user may specify that upon the automatic deletion of any electronic document form the user's in-basket prior to its review by the user an automatic failure of delivery message may be transmitted to the originator of that document explaining why that document has been discarded before being viewed by the recipient. For example, a general message may be transmitted indicating that the specified electronic document has been deleted from the recipient's in-basket due to the lapsing of the specified response time contained within that document.

Upon reference to the foregoing those skilled in the art will appreciate that the Applicant in the present application has created a method whereby the automatic transmission of a failure of delivery message within a data processing system can occur in response to the failure of the system to deliver an electronic document to the intended recipient or upon the automatic deletion of the electronic document from the recipient's in-basket prior to viewing by the recipient. In accordance with the method of the present invention, a user may specify one or more particular reasons for a failure of delivery which will initiate the automatic transmittal of failure of delivery message, as well as a particular time frame during which the failure of delivery message is valid. In this manner, a recipient may provide additional information to the originator which will explain why delivery of the electronic document has not occurred and/or indicate that period of time during which delivery is unlikely to occur.

While the invention has been particularly shown and described with reference to a preferred embodiment, it will be understood by those skilled in the art that various changes in form and detail may be made therein without departing from the spirit and scope of the invention.

I claim:

1. A method in a data processing system having an electronic mail delivery system for transmitting and receiving electronic documents between users within said data processing system for the automated transmission of specific failure of delivery message, said method comprising the data processing system implemented steps of:

prompting a first user within said data processing system to enter a specific message within said data processing system in response to an occurrence of a selected action among a plurality of actions which disables delivery of an electronic document to said first user, said specific message setting forth selected details regarding said selected action;

monitoring within said data processing system an attempted delivery of an electronic document from a second user within said data processing system to said first user; and automatically transmitting said specific message to said second user in response to an unsuccessful attempt to delivery said electronic document to said first user wherein said second user will automatically receive selected details regarding said action.

2. The method in a data processing system according to claim 1, wherein said step of prompting a first user within said data processing system to enter a specific message within said data processing system in response to an occurrence of an action disabling delivery of an electronic document to said first user comprises the step of prompting a first user within said data processing system to enter a specific message setting forth a duration of time during which delivery of an electronic document to said first user is disabled.

3. A data processing system for automatically transmitting specific failure of delivery messages in an electronic mail delivery system for transmitting and receiving electronic documents between users within said data processing system, said data processing system comprising:

means for prompting a first user within said data processing system to enter a specific message within said data processing system in response to an occurrence of a selected action among a plurality of actions which disables delivery of an electronic document to said first user, said specific message setting forth selected details regarding said selected action;

means for monitoring within said data processing system an attempted delivery of an electronic document from a system user within said data processing system to said first user; and means for automatically transmitting said specific message to said second user in response to an unsuccessful attempt to delivery said electronic document to said first user wherein said second user will automatically receive selected details regarding said action.

* * * * *